June 11, 1929.  W. E. WARNER  1,716,398
COFFEE PERCOLATOR
Original Filed July 5, 1927
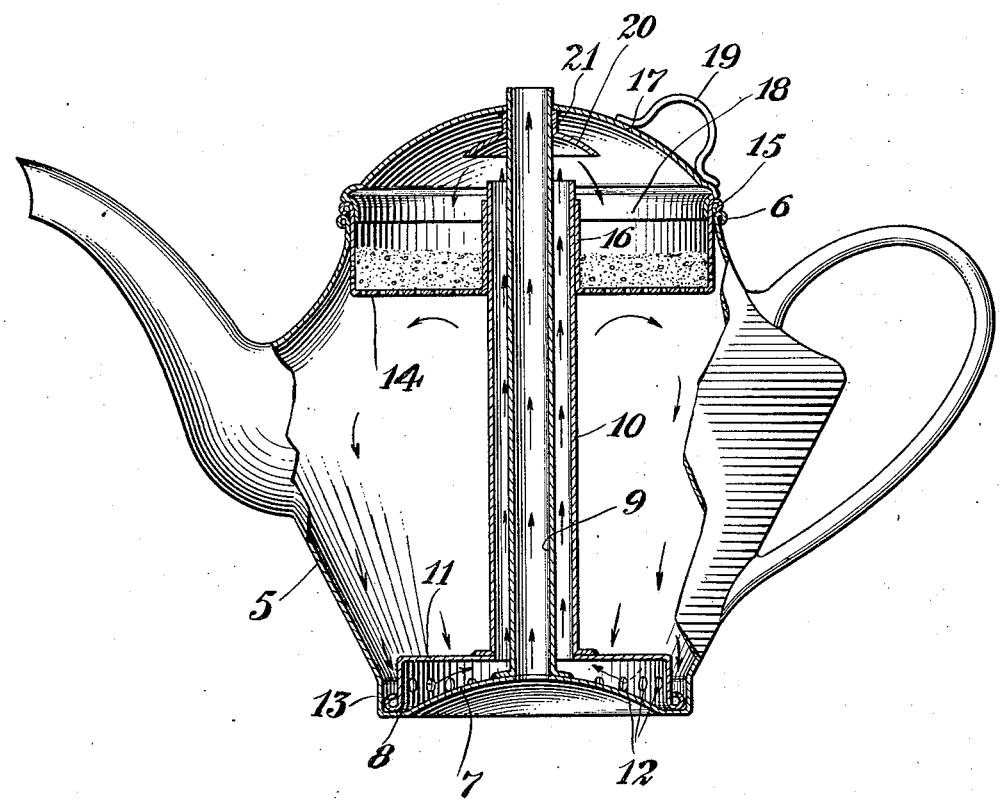
INVENTOR
William E. Warner
BY C. P. Zoepel
ATTORNEY Patented June 11, 1929.

1,716,398

UNITED STATES PATENT OFFICE.

WILLIAM E. WARNER, OF RAHWAY, NEW JERSEY, ASSIGNOR TO WARNER BROS. INC., OF NEWARK, NEW JERSEY, A CORPORATION OF NEW JERSEY.

COFFEE PERCOLATOR.

Application filed July 5, 1927, Serial No. 203,317. Renewed November 15, 1928.

This invention relates to coffee percolators, and has for its primary object to provide a percolator having improved means whereby a greater area of heat radiating surface may be obtained to expedite the boiling of the water and its upward flow into the coffee container or holder.

It is also another object of the invention to provide a simple means for producing a very rapid continuous circulation of the entire contents of the pot through the coffee holder so that a beverage of the desired strength may be quickly produced.

In one practical embodiment of the invention, I prefer to form the bottom wall of the pot with an upwardly projecting concave wall having a central vertically extending heat conducting flue. Around this flue a relatively large diameter water conducting tube having a cup-shaped base is adapted to be positioned, the wall of the base being perforated to permit the water from the pot to enter said tube. Thus, the flame impinging upon said concave bottom wall of the pot will very quickly raise the temperature of the water within said cup to the boiling point, the heated gases passing upwardly through said flue which provides an extensive heat radiating surface thereby also heating the water between the wall of said flue and said conducting tube. Thus a rapid circulation of the water in the pot is initiated so that its flows upwardly through the conducting tube and is discharged from the upper end thereof into the usual coffee holder or container which is supported within the upper end of the pot.

It is another object of the invention to provide improved means preferably carried by the pot cover for deflecting the water discharged from the upper end of the conducting tube and equally distributing the same upon the contents of the coffee holder.

With the above and other objects in view, the invention consists in the improved coffee percolator, and in the form, construction and relative arrangement of its several parts, as will be hereinafter more fully described, illustrated in the accompanying drawings, and subsequently incorporated in the subjoined claims.

The drawing represents a vertical sectional view illustrating one embodiment of my improved percolator.

For purposes of illustration, I have shown the pot or vessel 5 which may be of any desired external configuration, and of any predetermined capacity. As herein shown, the said pot is preferably formed from sheet aluminum or other metal, and at its upper open end is provided with the usual reinforcing bead 6.

The base wall of the pot 5 is formed with an upwardly projected concaved or cup-shaped section 7 surrounded by an annular horizontal section 8 connecting the concave wall section with the outer cylindrical wall of the pot. The concave wall 7 is provided with a central opening in which the lower end of a vertical tube or flue 9 is suitably secured, said flue projecting above the upper open end of the pot 6 and being open at its upper and lower ends.

Within the pot a water conducting member is adapted to be arranged, said member consisting of a tube 10 of appreciably greater diameter than the flue 9 and having a cup-shaped base 11, the outer cylindrical wall of which is provided with the spaced openings 12 and has its edge formed into the outwardly turned bead 13. This outer wall of the cup is of less diameter than the lower end of the body wall of the pot 5 and when the tube 10 is inserted downwardly over the flue 9, the bead 13 is directed by the convex upper surface of the base wall section 7 of the pot upon the horizontal base wall section 8, thus centering the tube 10 in spaced concentric relation to the flue 9. It will be noted that the top wall of the cup 11 is spaced above the concaved base wall 7 of the pot and that the tube 10 has its upper open end positioned below the upper open end of the flue 9.

The coffee holder shown at 14 may be of the usual form having the perforated wall and provided with a beaded edge indicated at 15 to seat upon the bead 6 on the upper end edge of the pot, it being understood that this holder is provided with the usual central sleeve indicated at 16 through which the water circulating tube 10 is loosely engaged. However if desired, I may eliminate this central sleeve and permanently fix the bottom wall of the holder to the wall of the tube 10 so that said holder, the tube 10 and the cup 11 may be inserted into or removed from the pot as a unit.

The cover 17 for the pot may be formed of sheet metal or of glass as desired and of various shapes, said cover having the usual flange 18 to frictionally fit within the upper end of the coffee holder 14 and preferably being provided with a suitable finger piece 19 fixed to its outer surface whereby said cover may be conveniently applied or removed. This cover carries a water deflecting plate 20 of concavo-convex form positioned within said cover in spaced concentric relation to the wall thereof. While said plate may be secured to the cover in various ways, I preferably provide the deflecting plate with a central sleeve or extension 21, the end of which is suitably fixed in a central opening provided in the cover 17. Through this sleeve and above the cover 17, the upper end portion of the heat conducting flue 9 projects.

From the above description, the manner of operation and several advantages of my present invention will be clearly understood. Thus, after the desired quantity of water has been placed within the pot 5, the cup 11 and tube 10 are inserted downwardly over the flue 9 and the holder 14 containing the coffee is then placed within the upper end of the pot, after which the cover 17 is applied. The pot is then set over the burner flame which impinges upon the concave bottom wall 7 thereof. The water between the wall of the cup 11 and the concave wall 7 will thus be very quickly heated to the boiling point and will start to flow upwardly through the tube 10. The heat from the products of combustion rising through the central flue 9 also highly heats the wall of this flue, such heat being radiated and absorbed by the body of water confined between the wall of said flue and the wall of the conducting tube 10. Therefore, the rapid circulation of the water is quickly initiated so that it flows upwardly and is discharged from the upper end of the tube 10 where it strikes upon the concave under surface of the deflecting plate 20 and is deflected outwardly and downwardly upon the coffee contained in the holder 14. The boiling water is discharged from the tube 10 in comparatively large volume and percolates through the coffee contained in the holder 14 and through the perforations in the walls thereof back into the pot. Thus, it will be apparent that a beverage of the desired strength may be very quickly obtained, thus an appreciable economy is realized in the consumption of gas or other fuel.

I have herein shown a preferred structural embodiment of the several essential features of my present improvements, but it will be understood that in practice, various alternatives of the several elements in so far as their structural form and arrangement are concerned, may be resorted to, and I therefore, reserve the privilege of making all such legitimate changes therein as may be fairly incorporated within the spirit and scope of the invention as claimed.

I claim:

1. A coffee percolator comprising a pot having a central heat conducting flue rising from the base thereof, a water conducting tube surrounding said flue in spaced relation to the wall thereof and having a cup-shaped base provided with a perforated wall, and a coffee holder adapted to be removably positioned in the upper end of the pot around said tube to receive the water discharged from the upper open end thereof.

2. A coffee percolator comprising a pot having a central heat conducting flue rising from the base thereof, a water conducting tube surrounding said flue in spaced relation to the wall thereof and having a cup-shaped base provided with a perforated wall, a coffee holder adapted to be removably positioned in the upper end of the pot around said tube to receive the water discharged from the upper open end thereof, a removable cover to close the open end of said holder, and a water deflecting plate surrounding the heat conducting flue between the wall of said cover and the upper end of the water conducting tube.

3. A coffee percolator comprising a pot having a central heat conducting flue rising from the base thereof, a water conducting tube surrounding said flue in spaced relation to the wall thereof and having a cup-shaped base provided with a perforated wall, a coffee holder adapted to be removably positioned in the upper end of the pot around said tube to receive the water discharged from the upper open end thereof, a removable cover to close the open end of said holder, said cover having a central opening to receive the upper end of said flue and carrying a water deflecting plate surrounding said flue and spaced from the under side of the cover.

4. A coffee percolator comprising a pot having an upwardly concaved base wall and a central heat conducting flue rising therefrom and extending above the upper open end of the pot, a removable water conducting tube surrounding said flue in spaced relation thereto and communicating with the interior of the pot at its lower end, the upper end of said tube being open and terminating below the upper open end of said flue, a coffee holder adapted to be positioned in the upper open end of the pot to receive the water discharged from the upper end of said tube, and a cover for the open end of the coffee holder having a central opening through which the upper end of said heat conducting tube projects.

5. A coffee percolator comprising a pot having a central heat conducting flue rising from the base thereof and extending above the open upper end of the pot, a removable water conducting tube surrounding said flue in spaced relation thereto and communicating with the interior of the pot at its lower end, the upper end of said tube being open and terminating below the open upper end of said flue, and a coffee holder adapted to be positioned in the upper end of the pot to receive the water discharged from the upper end of said tube.

In testimony that I claim the foregoing as my invention, I have signed my name hereto.

WILLIAM E. WARNER.